(12) United States Patent
Sim et al.

(10) Patent No.: US 11,902,109 B2
(45) Date of Patent: Feb. 13, 2024

(54) METHOD OF NETWORK SLICE RESOURCE ALLOCATION AND VISUALIZATION

(71) Applicant: SAMSUNG ELECTRONICS CO., LTD., Suwon-si (KR)

(72) Inventors: Sangyeok Sim, Suwon-si (KR); Ilkook Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/972,163

(22) Filed: Oct. 24, 2022

(65) Prior Publication Data

US 2023/0038522 A1 Feb. 9, 2023

Related U.S. Application Data

(63) Continuation of application No. PCT/KR2021/004849, filed on Apr. 19, 2021.

(30) Foreign Application Priority Data

Apr. 24, 2020 (KR) .................. 10-2020-0049725

(51) Int. Cl.
*G06F 15/177* (2006.01)
*H04L 41/5003* (2022.01)
(Continued)

(52) U.S. Cl.
CPC .......... *H04L 41/5003* (2013.01); *H04L 41/40* (2022.05); *H04L 45/76* (2022.05)

(58) Field of Classification Search
CPC ...... H04L 41/5003; H04L 41/40; H04L 45/76
(Continued)

(56) References Cited

U.S. PATENT DOCUMENTS

| 10,356,663 B2 | 7/2019 | Shimojou et al. |
| 11,039,363 B2 | 6/2021 | Arnold et al. |

(Continued)

FOREIGN PATENT DOCUMENTS

| EP | 3748908 A1 * | 12/2020 | ......... H04L 41/0893 |
| KR | 10-2018-0058642 | 6/2018 | |

(Continued)

OTHER PUBLICATIONS

Casetti et al., "Network slices for vertical industries", IEEE,https://ieeexplore.ieee.org/stamp/stamp.jsp?tp=&arnumber=8368981, May 2018, 7 pages. (Year: 2018).*

(Continued)

*Primary Examiner* — Liang Che A Wang
(74) *Attorney, Agent, or Firm* — NIXON & VANDERHYE P.C.

(57) ABSTRACT

The disclosure provides a method and a device for efficiently operating network slicing. According to the disclosure, a method of operating a first node configured to manage a network slice of a communication system includes: transmitting a service level agreement (SLA) range for each network slice subnet and a message requesting a resource according to the SLA range to a second node configured to manage the network slice subnet, receiving SLA arrangement flavor mapping relationship information in the network slice subnet unit from the second node, and identifying the SLA arrangement flavor mapping relationship in a network slice unit based on the received SLA arrangement flavor mapping relationship information in a network slice subnet unit.

20 Claims, 16 Drawing Sheets

(51) Int. Cl.
*H04L 41/40* (2022.01)
*H04L 45/76* (2022.01)

(58) Field of Classification Search
USPC .................................................. 709/220, 223
See application file for complete search history.

(56) References Cited

U.S. PATENT DOCUMENTS

| | | |
|---|---|---|
| 2018/0317133 A1 | 11/2018 | Sciancalepore et al. |
| 2019/0123963 A1 | 4/2019 | Tang et al. |
| 2019/0261186 A1 | 8/2019 | Xu et al. |
| 2022/0239568 A1* | 7/2022 | Celozzi ............... H04L 41/5051 |

FOREIGN PATENT DOCUMENTS

| | | | | |
|---|---|---|---|---|
| KR | 10-2019-0073507 | 6/2019 | | |
| KR | 10-2019-0142707 | 12/2019 | | |
| WO | WO-2018152825 A1 * | 8/2018 | ......... | H04L 41/5003 |
| WO | WO-2018170647 A1 * | 9/2018 | ......... | H04L 41/0806 |
| WO | WO-2019020171 A1 * | 1/2019 | ............. | H04L 41/04 |
| WO | 2019/145049 | 8/2019 | | |
| WO | 2019/184967 | 10/2019 | | |
| WO | 2019/206396 | 10/2019 | | |
| WO | 2019/210946 | 11/2019 | | |
| WO | 2020/031012 | 2/2020 | | |
| WO | WO-2020103523 A1 * | 5/2020 | | |

OTHER PUBLICATIONS

3GPP TS Specification #28.531, 3rd Generation Partnership Project; Technical Specification Group Services and System Aspect; Management and orchestration; Provisioning; (Release 16), Mar. 2020, 72 pages. (Year: 2020).*
International Search Report for PCT/KR2021/004849 dated Jul. 28, 2021, 5 pages.
Written Opinion of the ISA for PCT/KR2021/004849 dated Jul. 28, 2021, 4 pages.
Casetti et al., "Network slices for vertical industries", IEEE, https://ieeexplore.ieee.org/abstract/document/8368981, May 2018, 7 pages.
3GPP TS Specification #28.531, $3^{rd}$ Generation Partnership Project; Technical Specification Group Services and System Aspect; Management and orchestration; Provisioing; (Release 16), Mar. 2020, 72 pages.

* cited by examiner

| SLA | Deployment | Value | CPU | RAM | Storage |
|---|---|---|---|---|---|
| SLA_A | Deployment_A | 100 | 4 | 100 | 1000 |
| | Deployment_B | 200 | 5 | 200 | 2000 |
| | Deployment_C | 300 | 6 | 300 | 3000 |
| SLA_B | Deployment_A | 100 | 4 | 100 | 1000 |
| | Deployment_B | 200 | 5 | 200 | 2000 |
| | Deployment_C | 300 | 6 | 300 | 3000 |

FIG. 5

| SLA | Deployment | Value | CPU | RAM | Storage |
|---|---|---|---|---|---|
| SLA_A | Deployment_A | 100-300 | Value / 10 | Value + 100 | Value * 30 |
| SLA_B | Deployment_A | 50~100 | Value / 2 + 1 | Value + 200 | Value * 30 |

FIG. 6

Isolation

| Isolation* | Physical isolation | Logical isolation |
|---|---|---|
| No Isolation<br>Physical isolation<br>Logical isolation | Process and threads isolation<br>Physical memory isolation<br>Physical network isolation | Virtual resource isolation<br>Network Function isolation<br>Tenant/Service isolation |

Mission critical support

| Mission critical support* | Mission-critical capability support | Mission-critical service support |
|---|---|---|
| Non-mission-critical<br>Mission-critical | Inter-user prioritization<br>Pre-emption<br>Local control | MCPTT<br>MCData<br>MCVideo<br>IOPS<br>MC interworking |

MMTel support*

Not supported
Supported

Session and service continuity support*

None
SSC mode 1
SSC mode 2
SSC mode 3

Simultaneous use of the network slice

Can be used with any slice
Can be used with slices with same SST value
Can be used with any slice with same SD value
Cannot be used with another slice
Operator defined class

FIG. 9B

METHOD OF NETWORK SLICE RESOURCE ALLOCATION AND VISUALIZATION

CROSS-REFERENCE TO RELATED APPLICATIONS

This application is a continuation of International Application No. PCT/KR2021/004849 designating the United States, filed on Apr. 19, 2021, in the Korean Intellectual Property Receiving Office and claiming priority to Korean Patent Application No. 10-2020-0049725, filed on Apr. 24, 2020, in the Korean Intellectual Property Office, the disclosures of which are incorporated by reference herein in their entireties.

BACKGROUND

Field

The disclosure relates to a method and device for efficiently providing a network slice of a communication system.

Description of Related Art

While the evolutionary direction of existing networks is primarily to increase a data transfer rate, 5th communication systems (hereinafter interchangeable with 5G) aim to provide connectivity to accommodate various application services that could not be supported by existing networks as well as increase data transfer rate. Therefore, in the 5th generation communication system, massive Machine type communication (mMTC) which are large-scale inter-object communication capable of various applications such as IoT and Ultra-reliable and low latency communication (URLLC) that strictly requires low latency and reliability, such as industrial automation, vehicle-to-vehicle communication, unmanned aerial vehicles, and emergency notification, will be additionally provided as well as enhanced mobile broadband (eMBB) aimed at high-speed transmission of high-capacity data as traditional wireless data services.

In addition, network slicing technology is emerging to construct multiple networks by logically dividing network resources to satisfy different service level agreement (SLA, which refers, for example, to an agreement between the communication service provider and the customer to provide a predefined level of service) in one network infrastructure in order to provide various services.

Network slicing is a technology that divides virtual networks with different SLAs based on a common physical infrastructure, and provides a dedicated network specialized for various services with different characteristics by generating an end-to-end (E2E) logically separated network, including user devices, radio access networks (RANs), transport networks (TNs), and core networks (CNs), through a single physical network. Each network slice (or slice) is guaranteed a resource (a resource in a virtualized server, a virtualized network resource), and each slice is insulated from each other, so that it does not affect communication of other slices, when an error or failure occurs within a specific slice.

According to the network orchestration for the conventional network slice, there is a problem that the network slice is not performed efficiently.

SUMMARY

Embodiments of the disclosure provide a method and a device for performing efficient network slicing.

According to an example embodiment of the disclosure, a method of operating a first node of a communication system comprises: transmitting, based on a network slice requirement, a service level agreement (SLA) range for each network slice subnet and a message requesting a resource according to the SLA range to a second node; receiving SLA arrangement flavor mapping relationship information in the network slice subnet unit from the second node; and identifying the SLA arrangement flavor mapping relationship in a network slice unit based on the received SLA arrangement flavor mapping relationship information in a network slice subnet unit, and wherein the first node performs a function of managing the network slice, and the second node performs a function of managing a network slice subnet.

According to an example embodiment of the disclosure, a method of operating a second node of a communication system comprises: receiving, based on a network slice requirement, a service level agreement (SLA) range for each network slice subnet and a message requesting a resource according to the SLA range to a first node; and transmitting SLA arrangement flavor mapping relationship information in the network slice subnet unit from the first node, wherein the SLA arrangement flavor mapping relationship in a network slice unit is identified by the first node based on the received SLA arrangement flavor mapping relationship information in a network slice subnet unit, and wherein the first node performs a function of managing the network slice, and the second node performs a function of managing a network slice subnet.

According to an example embodiment of the disclosure, a device corresponding to a first node of a communication system comprises: a control unit comprising circuitry configured to: transmit, based on a network slice requirement, a service level agreement (SLA) range for each network slice subnet and a message requesting a resource according to the SLA range to a second node; receive SLA arrangement flavor mapping relationship information in the network slice subnet unit from the second node; and identify the SLA arrangement flavor mapping relationship in a network slice unit based on the received SLA arrangement flavor mapping relationship information in a network slice subnet unit, and wherein the first node is configured to manage the network slice, and the second node is configured to manage a network slice subnet.

According to an example embodiment of the disclosure, a device corresponding to a second node of a communication system comprises: a control unit comprising circuitry configured to: receive, based on a network slice requirement, a service level agreement (SLA) range for each network slice subnet and a message requesting a resource according to the SLA range to a first node; and transmit SLA arrangement flavor mapping relationship information in the network slice subnet unit from the first node, wherein the SLA arrangement flavor mapping relationship in a network slice unit is identified by the first node based on the received SLA arrangement flavor mapping relationship information in a network slice subnet unit, and wherein the first node is configured to manage the network slice, and the second node is configured to manage a network slice subnet.

According to various example embodiments, when generating a network slice, the operator can know a range of SLA parameters that are actually applicable, and can adjust a value of the SLA parameter within the range. In addition, the operator can immediately identify the network resource required when generating a network slice by changing the SLA value. In other words, since the amount of network resources may be converted into costs, the operator can perform efficient network operation according to network slices by easily predicting a cost of changing the SLA value of a network slice.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a diagram illustrating an example of a list of mapping relationships between SLA arrangement flavors according to various embodiments;

FIG. 6 is a diagram illustrating an example mapping relationship between SLA arrangement flavors based on an equation according to various embodiments;

FIG. 9B is a diagram illustrating an example of SLA modeling according to various embodiments;

DETAILED DESCRIPTION

Figure 1A:
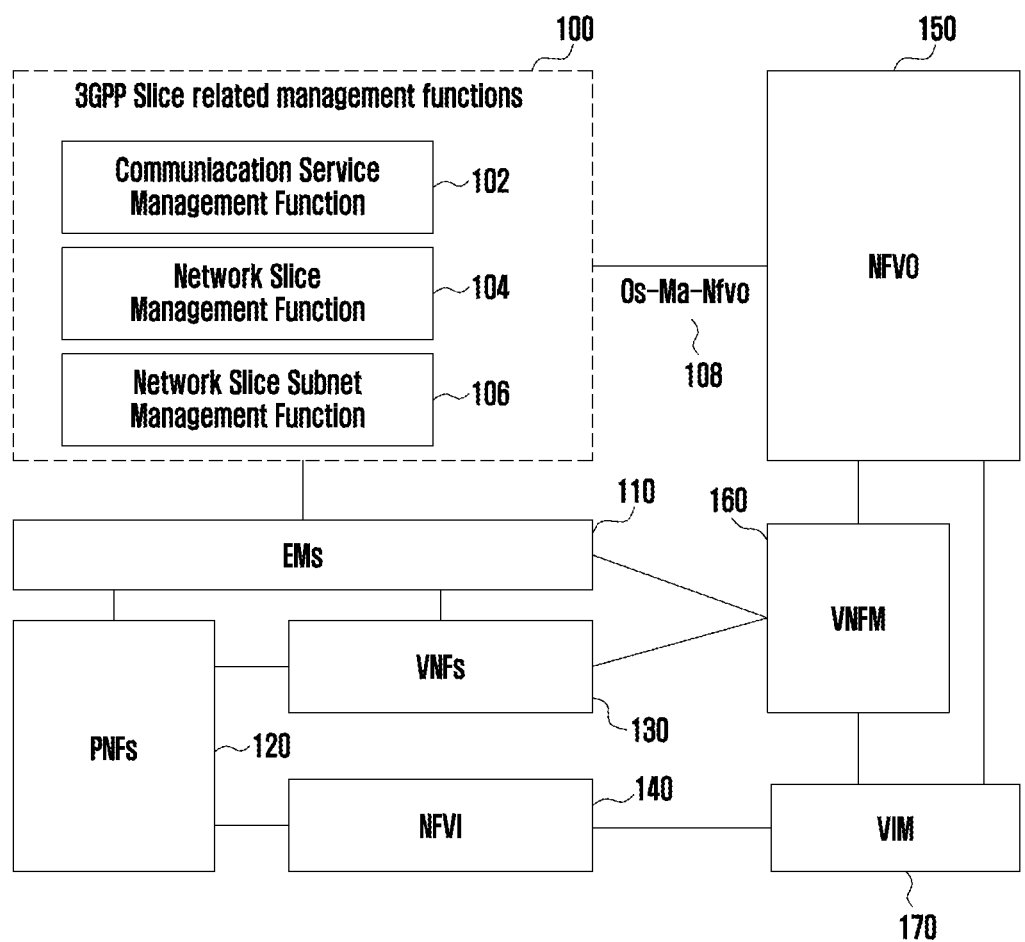
FIG. 1A is a diagram illustrating an example structure of an E2E network orchestration according to various embodiments.

Hereinafter, various example embodiments of the disclosure will be described in greater detail with reference to the accompanying drawings. In addition, when it is determined that a detailed description of a related known function or configuration may unnecessarily obscure the gist of disclosure, the detailed description thereof may be omitted. And the terms to be described later are terms defined in consideration of functions in the disclosure, which may vary depending on the intention or practice of the user, the operator, etc. Therefore, the definition should be made based on the content throughout this disclosure.

In addition, in explaining embodiments in detail, the of the disclosure is applicable to other communication systems having a similar technical background and channel type with slight modifications within the scope not significantly departing from the scope of the disclosure, and this will be possible at the judgment of a person with skilled technical knowledge in the technical field of the disclosure.

Advantages and features of the disclosure and methods for achieving them will become apparent with reference to the embodiments described below in detail with reference to the accompanying drawings. However, the disclosure is not limited to the embodiments disclosed below. The same reference numerals refer to the same components throughout the disclosure.

It will be understood that each block of processing flow chart drawings and combinations of flow chart drawings may be performed by computer program instructions. Since these computer program instructions may be mounted on processors of general-purpose computers, special computers, or other programmable data processing equipment, the instructions performed through the processors of the computer or other programmable data processing equipment generate a means to perform the functions described in the flow block(s). These computer program instructions may also be stored in computer-enabled or computer-readable memory that may be oriented toward computers or other programmable data processing equipment to implement functions in a certain way, so instructions stored in the computer-enabled or computer-readable memory may also produce manufactured items containing instruction means that perform the functions described in the flowchart block(s). Since computer program instructions may be mounted on a computer or other programmable data processing equipment, instructions for performing a computer or other programmable data processing equipment by performing a series of operational steps on a computer or other programmable data processing equipment to generate a computer-executed process may also provide steps to execute the functions described in the flow block(s).

In addition, each block may represent a module, segment, or portion of code comprising one or more executable instructions for executing a specific logical function(s). It should also be noted that it is also possible for the functions mentioned in the blocks to occur out of order in some alternative embodiment. For example, it is possible that two blocks illustrated in succession are actually performed substantially simultaneously, or it is possible that the blocks are sometimes performed in the reverse order according to the corresponding function.

In this case, the term '~unit' used in this embodiment may refer, for example, to software or hardware components such as FPGA or ASIC, and '—unit' performs certain roles. However, 'unit' is not limited to software or hardware. The '~unit' may be configured to be on an addressable storage medium or may be configured to play one or more processors. Thus, as an example, '—unit' comprises components such as software components, object-oriented software components, class components, and task components, processes, functions, attributes, procedures, subroutines, segments of program code, drivers, firmware, microcode, circuits, data, database, data structures, tables, arrays, and variables. Functions provided within the components and '—unit's may be combined into a smaller number of components and'—unit's or further separated into additional components and '—unit's. In addition, the components and'—unit's may be implemented to play one or more CPUs in the device or secure multimedia card.

FIG. 1A is a diagram illustrating an example structure of an E2E network orchestration according to various embodiments.

Referring to FIG. 1A, the European Telecommunications Standards Institute (ETSI) defines a structure for network function virtualization (NFV). NFV is a network function virtualization technology that makes the equipment (hardware) necessary for the communication network configuration into software so that users may configure the necessary network server by collecting the desired functions in the server and increasing the network flexibility. In addition, the 3rd Generation Partnership Project (3GPP) defines a management function related to three network slices for network slice management.

The 3GPP slice related management functions 100 include a communication service management function (CSMF) 102, a network slice management function (NSMF) 104 and a network slice subnet management function (NSSMF) 106. The CSMF 102 serves to convert communication service-related requirements into network slice-related requirements. The NSMF 104 is responsible for the management of a network slice instance (NSI) (which includes the lifecycle of the NSI). The NSMF 104 derives network slice subnet related requirements from network slice related requirements and communicates with CSMF 102 and NSSMF 106. The NSSMF 106 is responsible for managing a network slice subnet instance (NSSI) (which includes the lifecycle of the NSSI) and communicates with the NSMF 104. The 3GPP slice related management function 100 communicates with element management (EM) 110.

The NFVO (network function virtualization orchestrator) 150 is connected to the 3GPP slice related management function 100 and Os-Na-Nfvo interface, is an extension of the current operations support systems (OSS)/business support systems (BSS), and performs the function of managing the deployment and operation of NFVI (Network Functions Virtualization Infrastructure, NFV infrastructure) 140 and VNFs. It also plays a role in managing resources from a holistic perspective by being connected to one or more virtualized infrastructure managers (VIMs) 170. In addition, it is connected to the VNFM (virtualized network function (VFN) manager) 160 to perform the E2E service.

The VNFM 160 manages the VFN layer in which the virtualization of the network function is performed, and in particular, serves to manage possible resources for VNF. The VNFM 160 is connected to one or more VNFs 130. The VIM 170 is for managing NFVI 140 and serves to manage computing, storage, networking hardware, software that implements virtualization layers, and virtualized hardware. The VNF 130 is a block that performs a specific network function (router, switch, firewall, load balancing, etc.). It uses a virtual machine provided by NFVI 140 and is implemented through software that performs a virtualized network function.

The NFVI 140 is a block (or node or entity) that is the basis of the NFV structure, and a concept including hardware for hosting a virtual machine, network hardware, software enabling virtualization, virtual computing, a virtual storage unit, a virtual network, and the like.

The EM 110 is a block for helping the implementation of the management function of the VNF 130, and the management range of the EM 130 is similar to a conventional element management system (EMS), and serves as a layer for interaction between the network management system and devices performing network functions. The EM 130 communicates with the VNF 130 and the VNFM 160. A physical network function (PNF) 120 refers to a physical network device used in an existing network.

Although the blocks described in the disclosure are illustrated as being separate, they may be located at the same physical location or at different physical locations, and may be implemented on one or more hardware through virtualization. In other words, a plurality of blocks may be implemented as one hardware device, or one block may be implemented through a plurality of hardware devices.

Figure 1B:
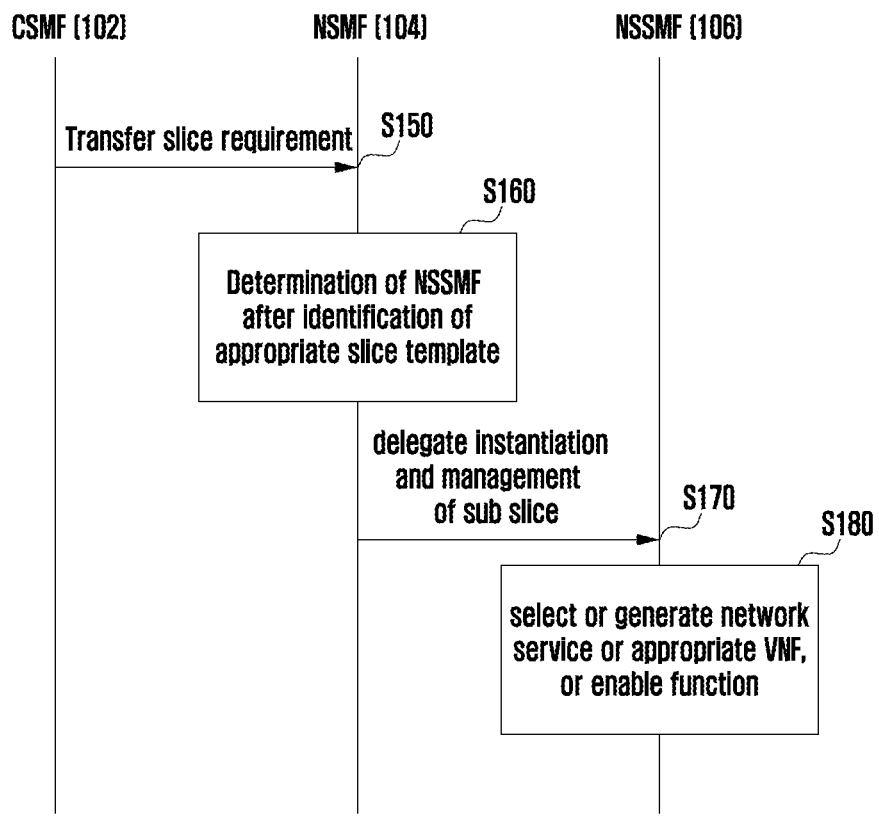
FIG. 1B is a signal flow diagram illustrating an example of a procedure for generating a network slice according to various embodiments.

A procedure for generating a network slice in the structure of FIG. 1A is the same as or similar to that of FIG. 1B. FIG. 1B is a signal flow diagram illustrating an example procedure for generating a network slice according to various embodiments.

In S150, the CSMF 102 converts the customer's service requirement into a specific slice requirement and transmits it to the NSMF 104. Such a requirement may include at least one of a slice type and SLA, but is not limited thereto. The NSMF 104 identifies a suitable slice template from the catalog and selects the NSSMF 106 corresponding to the sub-slice displayed in the slice template based on the slice type (e.g., eMBB, URLLC, etc.) received from the CSMF 102 and SLA (e.g., number of user equipment, bandwidth, latency, etc.) (S160). In this process, SLA distribution for sub-slice is also performed, and for this purpose, a preset distribution algorithm may be generally used. For example, when the distribution of latency is RAN:TN:CN=2:1:1 and the SLA latency is 8 ms, the latency of each domain may be distributed such that the delay of the sub-slice of the RAN domain is 4 ms, the delay of the sub-slice of the TN domain is 2 ms, and the delay of the sub-slice of the CN domain is 2 ms.

The NSMF 104 selecting the NSSFM 106 delegates instantiation and management of each sub-slice to the appropriate NSSMF 106 (S170). The NSSMF 106 selects a network service or VNF instance suitable for the sub-slice through a northbound interface (NBI) of the NFVO 150 or performs a new generation request and activates functions (S180).

When a network slice is generated through the process of FIG. 1B, the following disadvantages may exist. When generating a network slice, it is difficult to identify the required resources of the network slice. E2E-ochestrator (E2E-O), which is responsible for the NSMF functions, requests the generation of network slice subnets by dividing the SLA of network slices into subnet domain units for network slice generation. The network slice subnets are transferred to each domain orchestrator (domain-O) and are divided back into network services. In other words, since the resources required to generate the actual network slice are dealt with at the end, the infrastructure resources required by the network slice are not known when generating the network slice.

There is a problem that it is difficult to know whether the network slice SLA is configurable at the time of setting. When distributing the network slice SLA to subnets, a top-down method is used by utilizing slice templates and slice instances. Even when the higher level of distribution decision is wrong, it is a structure that may identify whether the slice SLA of the network may be set, only at the end.

There is a problem that the type or scope of SLA applicable within the managed infrastructure may not be known during SLA distribution. when a slice subnet is configured without knowing the range of applicable SLA values, repeated adjustments are required because SLA distribution may not be performed properly. In the end, automation management becomes difficult.

In order to address these problems, the disclosure provides a structure and a method for integrated management of network slices through the mapping of SLA and deployment flavor, and the following effects may be obtained according to the disclosure. For example, when requesting network slice generation, network resource information required by the network slice is provided so that the entire network slice structure may be intuitively and easily understood. For example, by providing the applicable range of the network slice SLA value to be generated within the E2E infrastructure, the operator may perform optimized slice management. For example, it is possible to manage shared network slices by enabling the management of available resource and allocated resource of network slice instances. Further, since the operator may identify a type and capacity of infrastructure resources required to generate a network slice before generating a network slice, the slice management cost may be estimated in advance.

Figure 2:
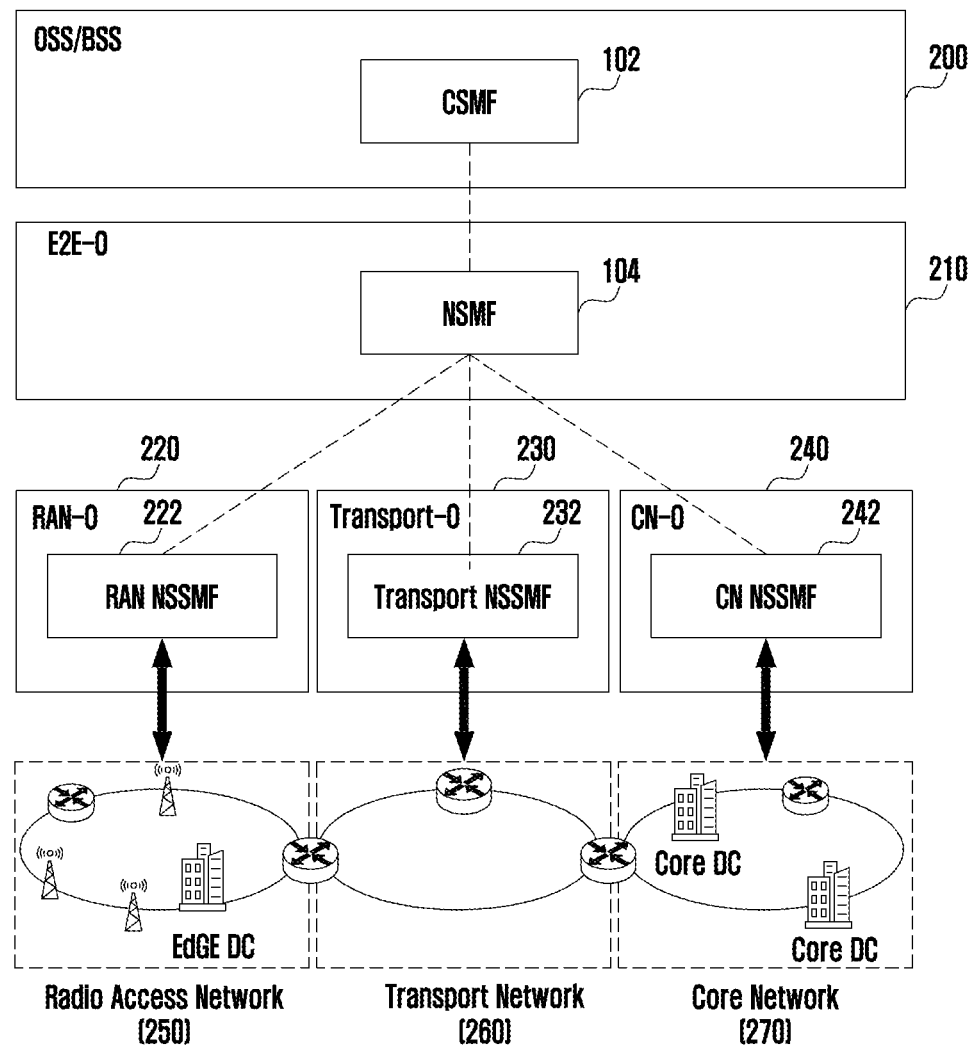
FIG. 2 is a diagram illustrating an example structure of an E2E network orchestration according to various embodiments.

FIG. 2 is a diagram illustrating an example structure of an E2E network orchestration according to various embodiments. Referring to FIG. 2, an OSS/BSS 200 includes a CSMF 102, and the CSMF 102 is connected to the NSMF 104. The NSMF 104 is included in the E2E-O. The E2E-O refers to an orchestrator that integrates and manages E2E infrastructure to support network slices and provide E2E services. A domain orchestrator exists for each domain area under the E2E-O 210 to perform a management function specialized for each domain. As an example, the NSMF 104 may be connected to a plurality of NSSMFs, the RAN NSSMF 222 may be included in the RAN-O (RAN orchestrator) 220 that manages the RAN 250, the transport NSSMF 232 may be included in the transport-O (transport orchestrator) 230 that manages the TN 260, and the CN NSSMF 242 may be included in CN-O (CN orchestrator) 240 managing the CN 270. Although three domains of RAN, TN, and CN are illustrated in FIG. 2, a domain of a new area may be added.

Although the blocks described are illustrated as being separate, they may be located at the same physical location or at different physical locations, and may be implemented on one or more hardware through virtualization. In other words, a plurality of blocks may be implemented by one hardware device, or one block may be implemented by a plurality of hardware devices.

Figure 3:
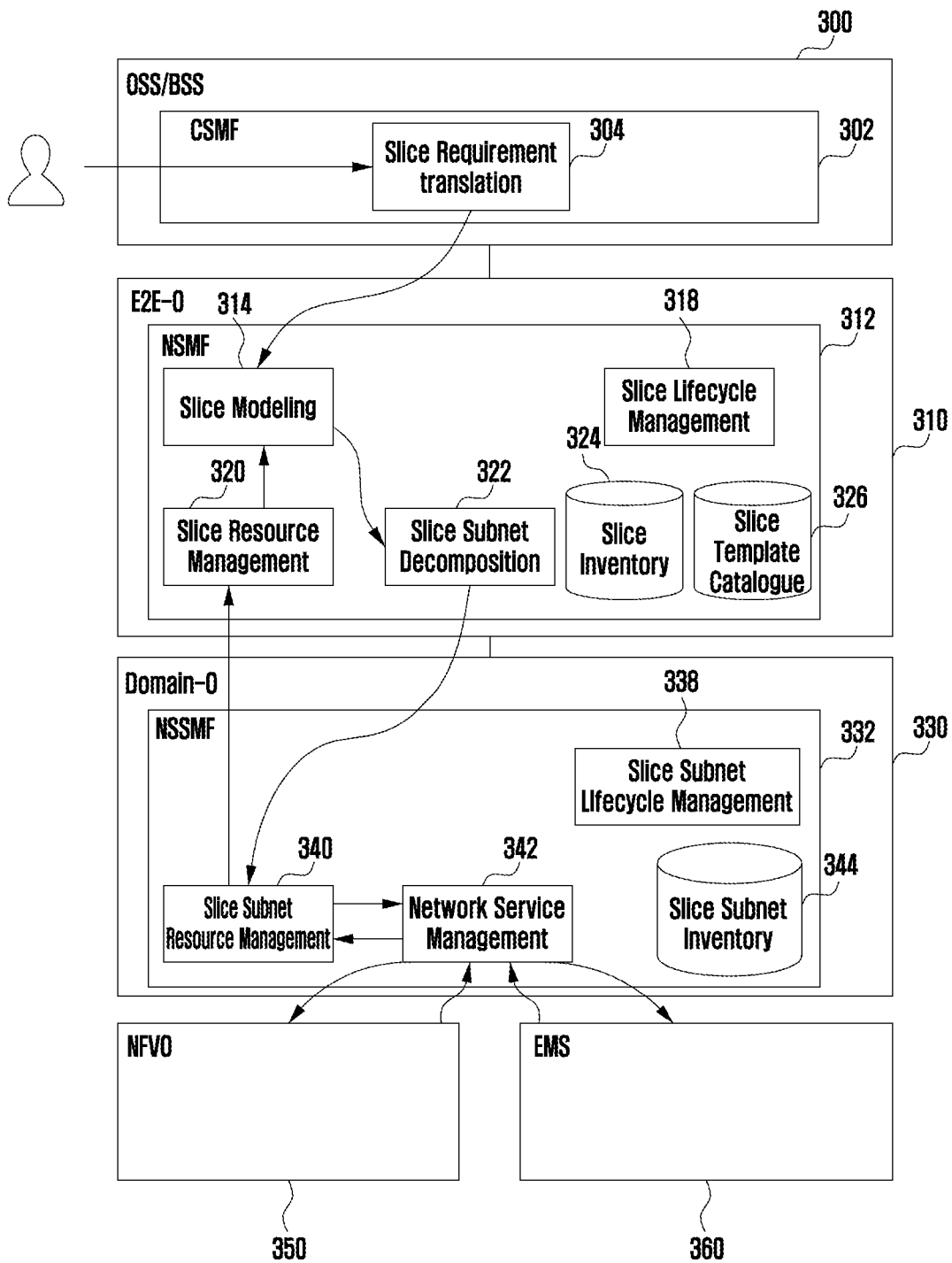
FIG. 3 is a diagram illustrating an example structure for performing various functions according to various embodiments.

FIG. 3 is a diagram illustrating an example structure for performing various functions of the disclosure according to various embodiments. According to FIG. 3, the OSS/BSS 300 includes a CSMF 302, and the CSMF 302 includes a slice requirement translation unit 304. The slice requirement translation unit 304 performs a function of changing the service requirement to the network slice requirement. The E2E-O 310 connected to the OSS/BSS 300 includes an NSMF 312, and the NSMF 312 includes a slice modeling unit 314, a slice lifecycle management unit 318, a slice resource management unit 320, and a slice subnet decomposition unit 322.

The slice modeling unit 314 performs a function of configuring a network slice by mapping a specific value or range from a network slice template. The slice lifecycle management unit 318 manages lifecycles such as instantiation (which may be understood as instance generation), activation, modification, deactivation, and termination of network slices. The slice resource management unit 320 performs a function of managing resources of network slice subnets including network slices. The slice subnet decomposition unit 322 performs a function of dividing a network slice requirement into a network slice subnet requirement. The slice inventory 324 stores a resource including a network slice instance, a slice subnet, and a relationship between the resource and the slice subnet. The slice template catalog 326 is a storage of network slice templates, and wherein the network slice template includes a requirement for specifying a network slice for a specific use case.

The domain-O 330 connected to the E2E-O 310 includes an NSSMF 332 for each domain, and the NSSMF 332 includes a slice subnet life cycle management unit 338, a slice subnet resource management unit, 340, network service management unit, 342, and a slice subnet inventory 344.

The slice subnet lifecycle management unit 338 performs a function of managing a lifecycle such as instantiation, activation, modification, deactivation, and termination of a network slice subnet. The slice subnet resource management unit 340 performs a function of managing resources of network services including the network slice subnet. The network service management unit 342 is responsible for the function of generation, deletion, modification request, or collecting status information for the network service by communicating with the NFVO 350 and the EMS 360. Slice subnet inventory 344 stores the resources including the network slice subnet inventory, network services, and relationships therebetween. Although not illustrated, the NSSMF 332 may further include a slice subnet modeling unit and a slice subnet template catalog, wherein the slice subnet modeling unit performs the function of configuring a network slice subnet by mapping specific values or ranges from the network slice subnet template, and wherein the slice subnet template catalog is a storage of network slice subnet templates and includes requirements that characterize a network slice subnet for a specific use case called a network slice subnet template.

The domain-O 330 is connected to the NFVO 350 and the EMS 360.

Although FIG. 3 illustrates each unit or part performing each function in the form of a block, the illustrated unit may be considered to perform the function through software installed in hardware.

Figure 4:
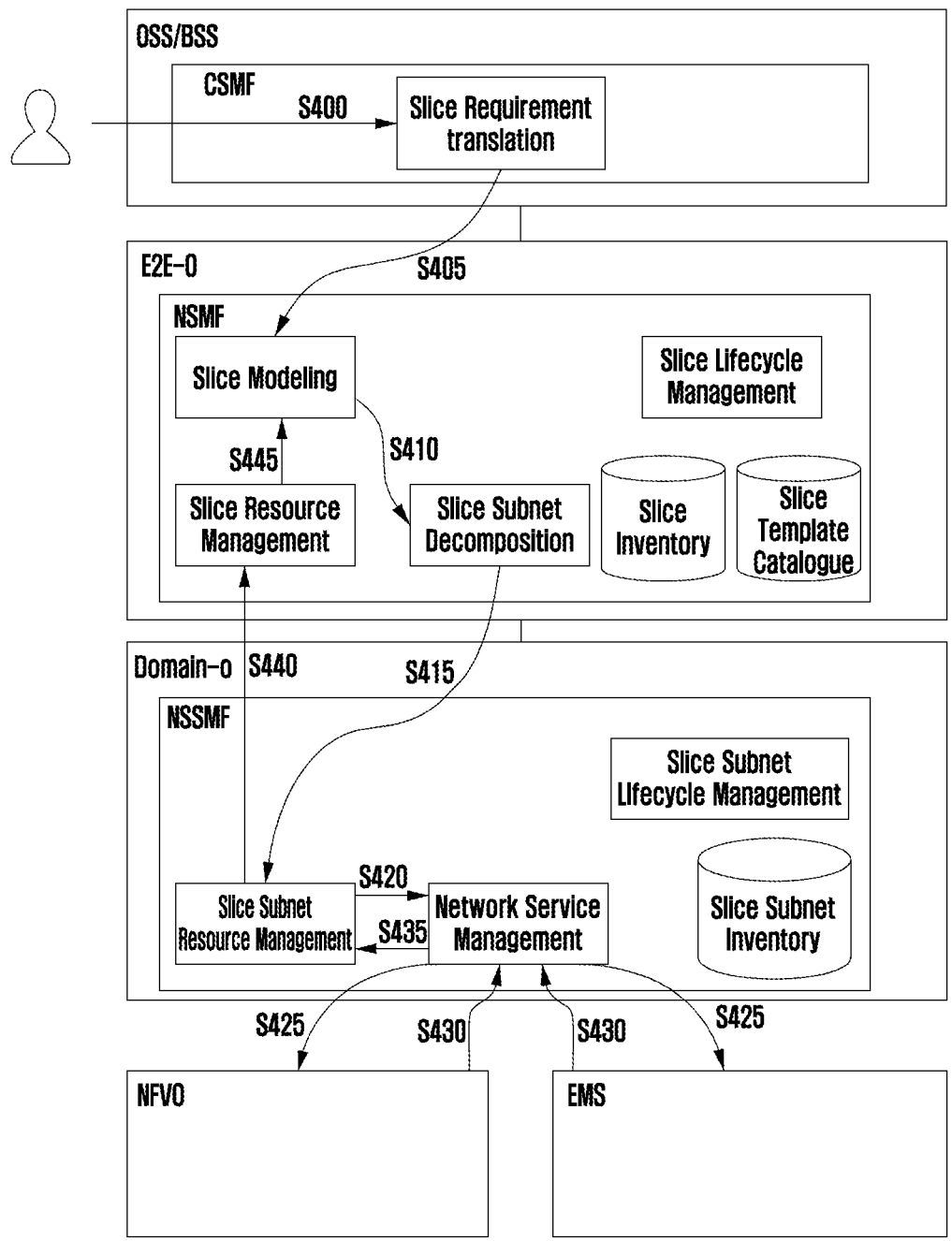
FIG. 4 is a diagram illustrating an example operation for obtaining an SLA available range related to a network slice according to various embodiments.

FIG. 4 is a diagram illustrating an example operation for obtaining an SLA available range related to a network slice according to various embodiments.

The customer transmits the service requirement to the CSMF 300 (S400). The slice requirement translation unit 304 converts the customer service requirement into a network slice requirement and then transmits it to the NSMF 312 (S405). The slice modeling unit 314 that has received the network slice requirement extracts a network slice template suitable for the network slice requirement from the slice template catalog 326, and then requests the slice subnet decomposition unit 322 to separate the slice subnet (S410).

The slice subnet decomposition unit 322 selects a subnet domain suitable for the network slice requirement and requests the NSSMF 332 of each domain for the SLA range and required resources for each slice subnet (S415). The slice subnet resource management unit 340 in the NSSMF 332 requests the network service management unit 342 for SLA ranges and necessary resources of NFs satisfying the slice subnet requirements (S420). The network service management unit 342 queries (e.g., requests information) the network slice instance and catalog from the NFVO 350 for the requested NFs and requests available resource information from the EMS 360 (S425). The NFVO 350 and the EMS 360 respond to the request from the network service management unit 342 (S430).

The network service management unit 342 transmits the collected network service (NS) information to the slice subnet resource management unit 340 (S435). The slice subnet resource management unit 340 integrates the received NS information in units of slice subnets, generates (or selects) the SLA ARRANGEMENT FLAVOR mapping relationship of the slice subnet, and transfers it to the NSMF 310 (S440). Such a mapping relationship may be recorded in advance, or it is also possible for the higher management unit to generate it based on the mapping relationship of the lower management unit. A higher-lower order is determined in the order of network slice-network slice subnet-network service-VNF, and for example, the network slice management unit may be understood as a higher unit of the network slice subnet management unit. For example, in a network service descriptor or VNF descriptor, a deployment flavor for how much CPU (central processing unit) or memory is allocated exists, and each of them may be one or more. One of them is selected and arranged.

The slice resource manager 320 integrates the SLA ARRANGEMENT FLAVOR mapping relationship in units of slice subnets to generate the SLA ARRANGEMENT FLAVOR mapping relationship in units of slices and transmits them to the slice modeling unit 314 (S445).

When the above process is completed, the slice modeling unit 314 may know the applicable SLA type, the applicable range of each SLA value, and required resource information according to the SLA value.

Through this process, the slice modeling unit 314 may select an appropriate arrangement flavor according to the required performance by obtaining the mapping relationship of the SLA ARRANGEMENT FLAVOR, and since the slice modeling unit 314 may know in advance the type and number of resources to be allocated, such as the amount of CPU and memory to be allocated, from the selected arrangement flavor, it is possible to identify the necessary resources before arranging the network slice. Also, for example, when arrangement flavor A supports a bandwidth of 1 Gbps and arrangement flavor B supports a bandwidth of 2 Gbps for network service A, further bandwidth may not be supported by network service A. In this case, even when the bandwidth is set to 3 Gbps as the SLA requirement, a slice generation may fail because there is no arrangement flavor that satisfies the requirement. According to the disclosure, in the case of managing the SLA ARRANGEMENT FLAVOR mapping relationship, when modeling a slice, it is possible to prevent such an error because the range of the settable SLA may be known in advance.

FIG. 5 is a diagram illustrating an example list of mapping relationships between SLA arrangement flavors according to various embodiments. According to FIG. 5, an SLA ARRANGEMENT FLAVOR mapping relationship may exist for a slice, a slice subnet, and a network service NS, respectively. The higher unit mapping relationship may be generated by merging the mapping relationship of the lower unit. A value determined according to an SLA type may be a selection a specific item or ON/OFF relationship of rather than a range, and in this case, SLA-Deployment Flavor mapping in a list foam may be used as shown in FIG. 5 (Whether or not to turn on/off for a specific additional function may be included in the batch flavor. For example, whether to apply encryption, whether to share resources with other slices, etc. may correspond to this). For example, in case that SLA corresponds to SLA_A and the deployment is A, the value (This value is for the scope of the SLA, such as 100 milliseconds (ms) latency, which is not limited to the example described, and may be understood as a value for the requirements of a typical SLA.) is 100, the CPU may be allocated by 4, random access memory (RAM) may be used by 100, and storage by 1000 may be used. The resource mapped to the SLA illustrated in FIG. 5 is only an example, and at least one of the illustrated resources and a resource not illustrated may be mapped to the SLA. For example, in a virtualized infrastructure, the types of resources may be CPU, memory, storage, and network, and in PNF, various resources such as frequency bands and scheduling queues may be included.

FIG. 6 is a diagram illustrating an example mapping relationship between SLA arrangement flavors based on an equation according to various embodiments. According to FIG. 6, when the SLA has a range such as a bandwidth or a number of sessions, the SLA ARRANGEMENT FLAVOR may be mapped based on an equation as shown in FIG. 6. For example, when the SLA is SLA_A and the deployment is A, the value may be 100 to 300, and in this case, the CPU, RAM, and storage that may be allocated may be calculated based on a function using the value.

Figure 7:
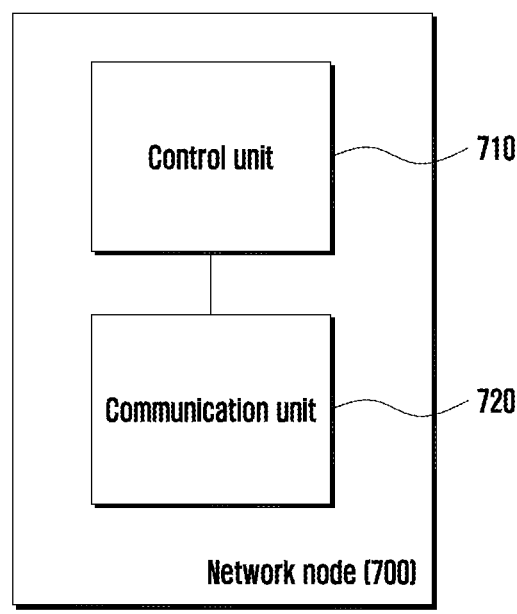
FIG. 7 is a block diagram illustrating an example configuration of a device according to various embodiments.

FIG. 7 is a block diagram illustrating an example configuration of a device capable of performing operations according to various embodiments. Referring to FIG. 7, the network node (or entity, or block) 700 includes a control unit (e.g., including various circuitry) 710 and a communication unit (e.g., including various communication circuitry) 720. The communication unit 720 may include various communication circuitry and is connected to another network node using wired/wireless to transmit and receive signals under the control of the control unit 710, generates a message generated by the control unit 710 as a physical signal and transmits the generated message to another network node, receives a signal transmitted by another network node, processes the received signal, and transmits the received signal to the control unit 710. The control unit 710 may include various circuitry and is a device for controlling to perform the management functions or functions described in the present disclosure, and may include a storage unit.

Figure 8:
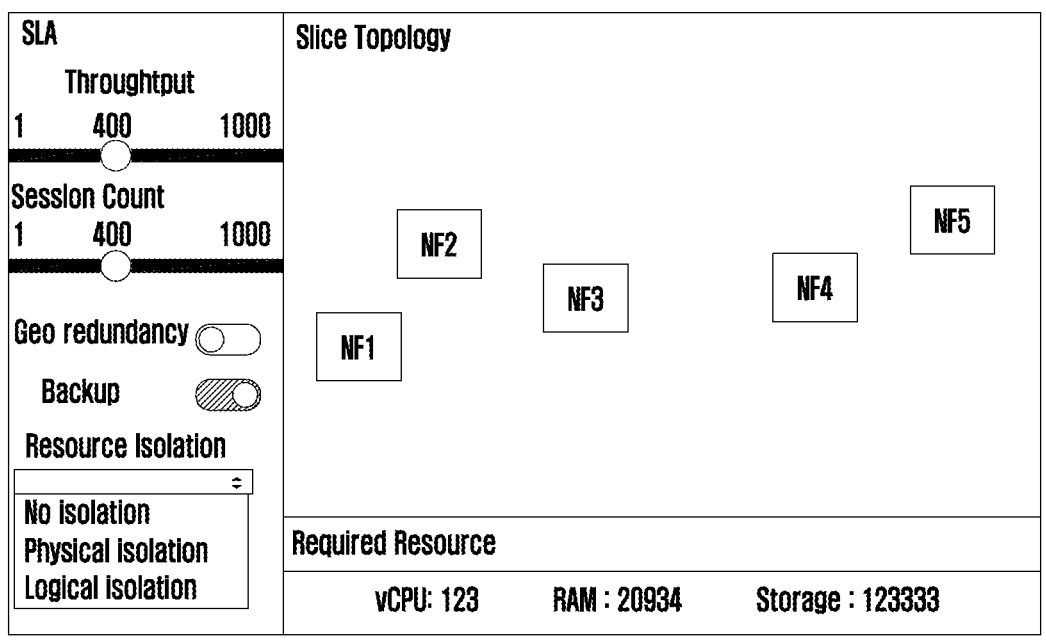
FIG. 8 is a diagram illustrating an example of a slice modeling user interface capable of variably applying an SLA according to various embodiments.
Figure 9A:
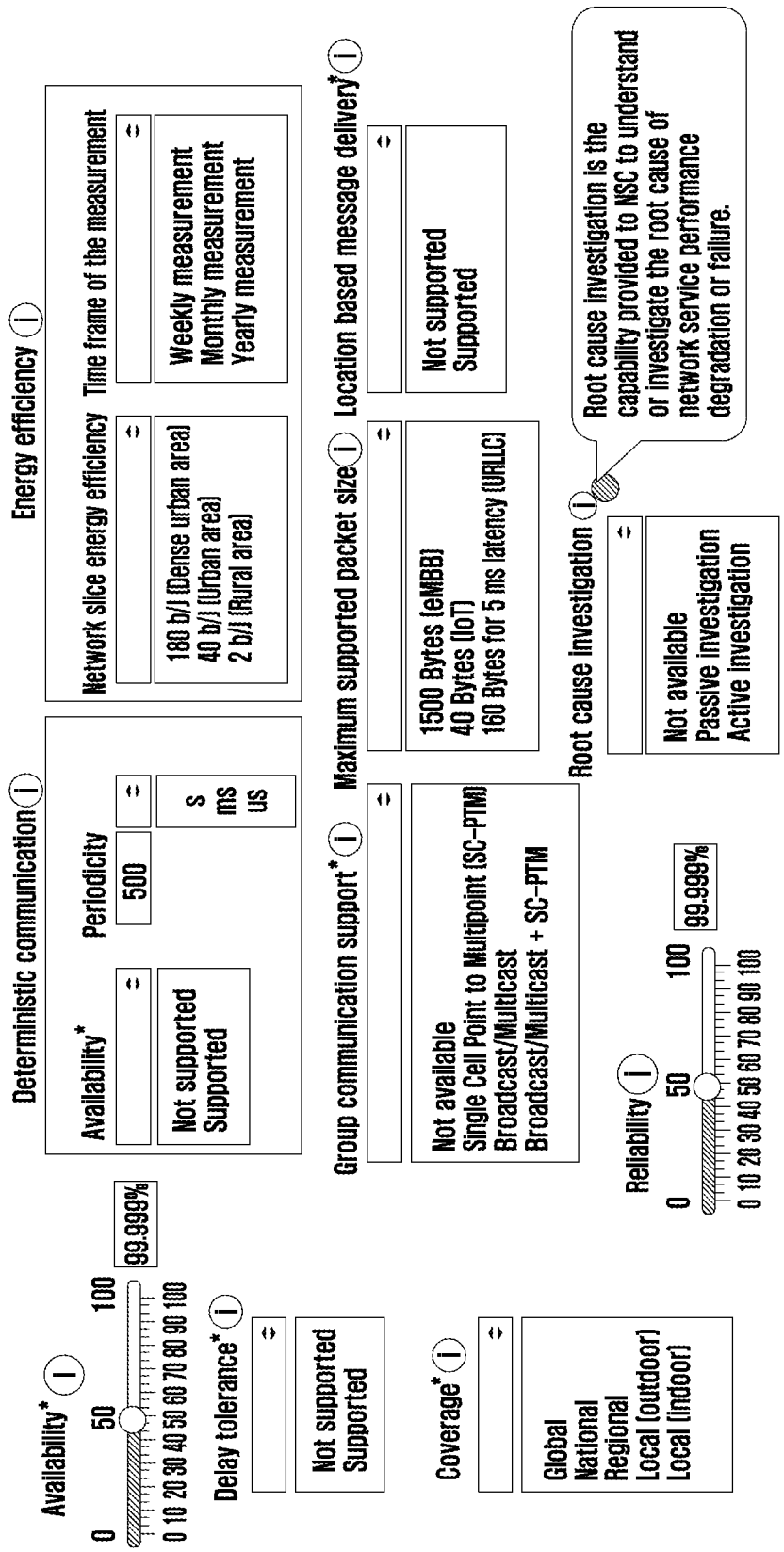
FIG. 9A is a diagram illustrating an example of SLA modeling according to various embodiments.
Figure 9C:
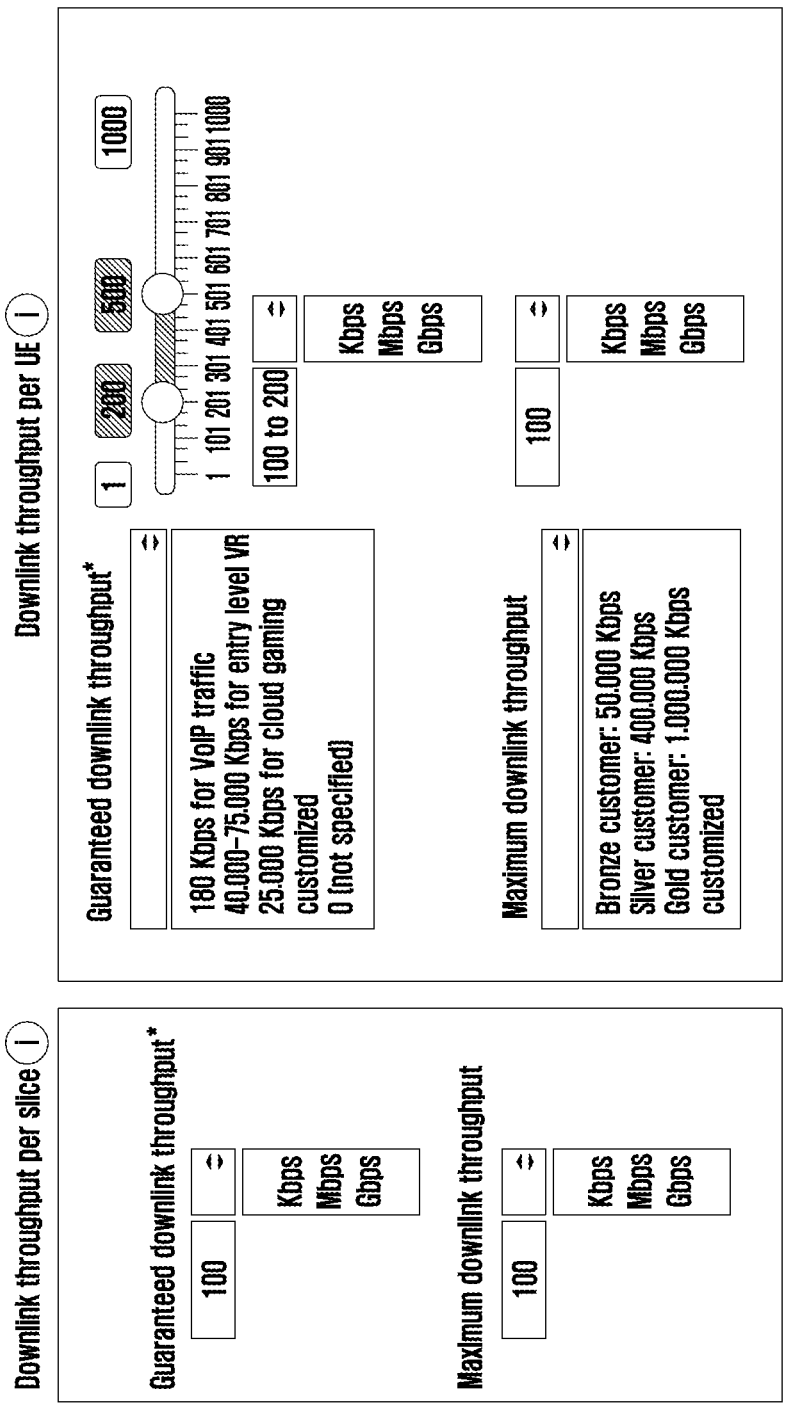
FIG. 9C is a diagram illustrating an example of SLA modeling according to various embodiments.
Figure 9D:
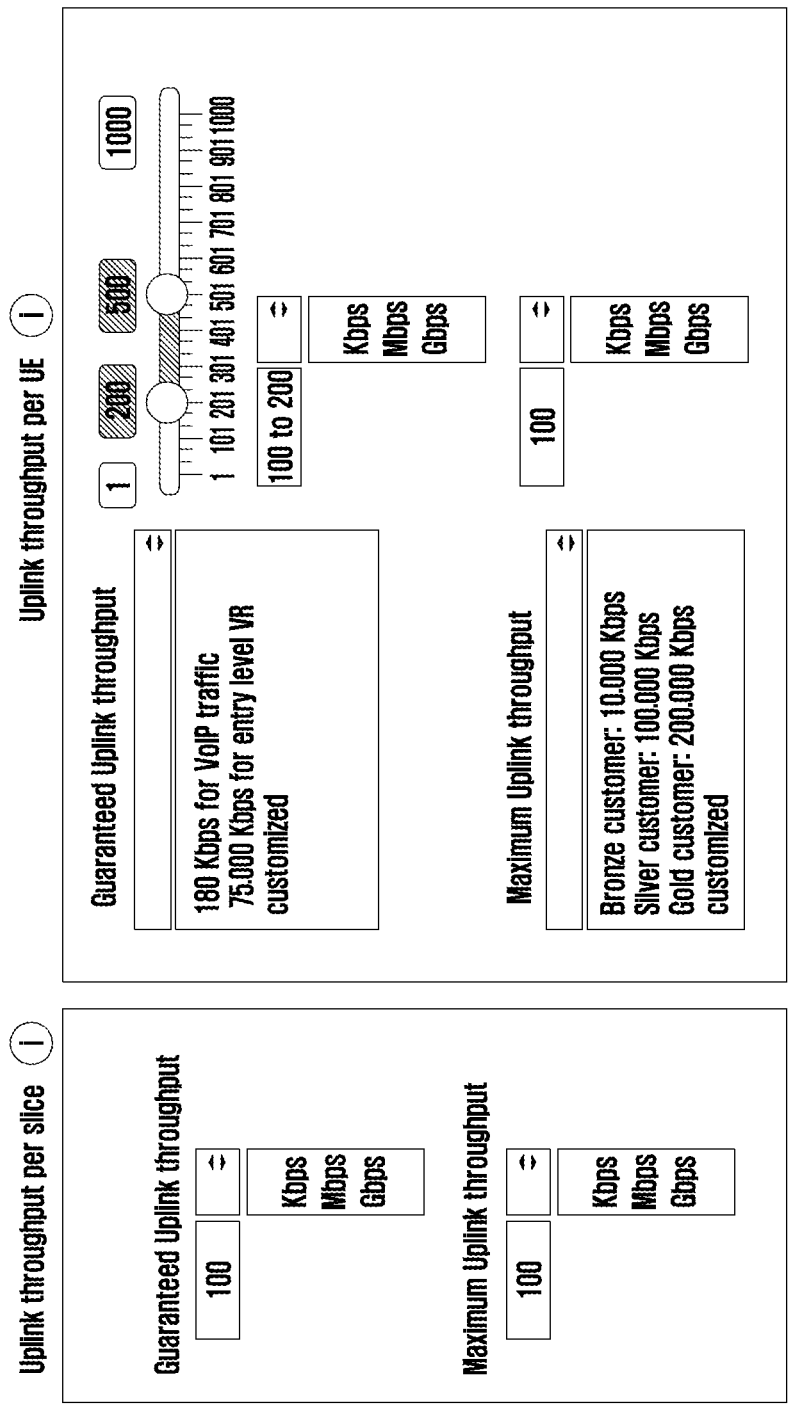
FIG. 9D is a diagram illustrating an example of SLA modeling according to various embodiments.
Figure 9E:
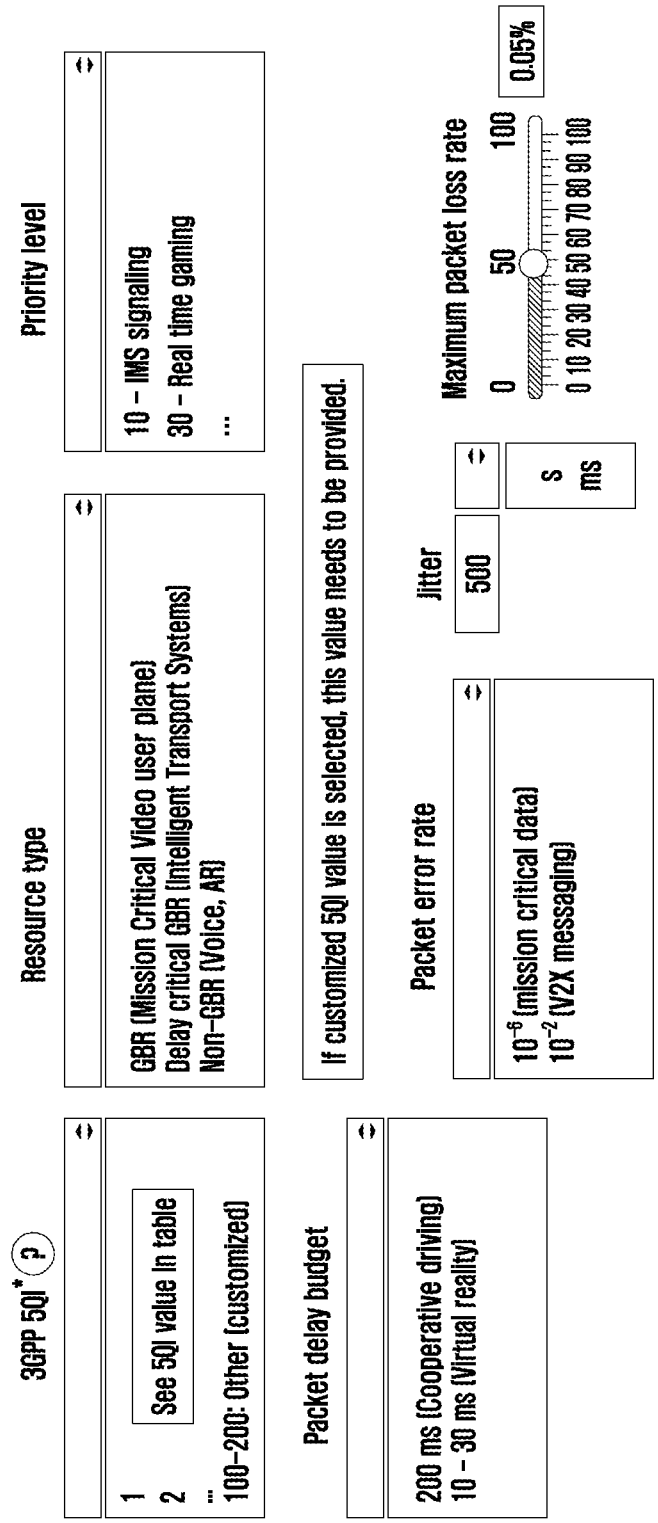
FIG. 9E is a diagram illustrating an example of SLA modeling according to various embodiments.
Figure 9F:
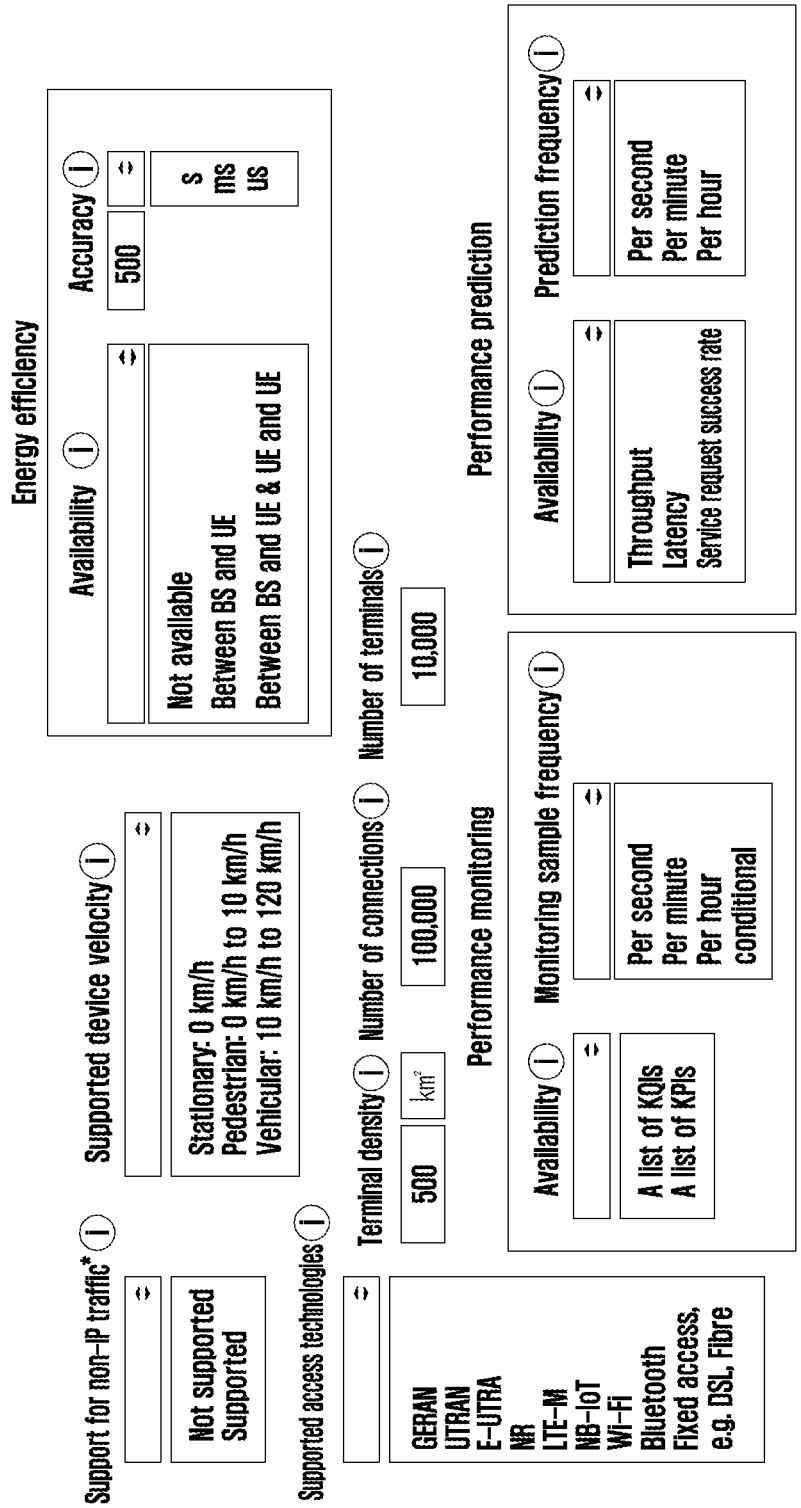
FIG. 9F is a diagram illustrating an example of SLA modeling according to various embodiments.
Figure 9G:
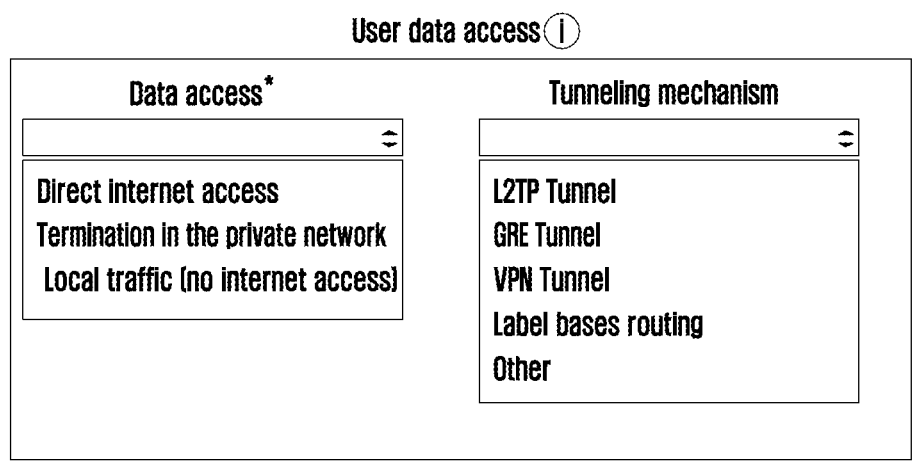
FIG. 9G is a diagram illustrating an example of SLA modeling according to various embodiments.

FIG. 8 is a diagram illustrating an example slice modeling user interface capable of variably applying an SLA according to various embodiments. By adjusting the requirements of the SLA (e.g., throughput or session, but is not limited thereto), the network function including the slice may be visualized, and the resources required by the visualized network function may be identified.

FIGS. 9A, 9B, 9C, 9D, 9E, 9F and 9G (which may be referred to as FIGS. 9A to 9G) are diagrams illustrating examples of SLA modeling. FIGS. 9A to 9G disclose a plurality of parameters (hereinafter, SLA parameters) to be set for SLA modeling, and each parameter may be set to a corresponding value. The operator may set an SLA parameter within a supported range according to the SLA ARRANGEMENT FLAVOR mapping relationship according to the disclosure.

According to the disclosure, when generating a network slice, the operator may know the range of SLA parameters that are actually applicable and may adjust the value of the SLA parameters within the range. In addition, the operator may immediately identify the network resources required when creating a network slice by changing the SLA value. In other words, since the amount of network resources may be converted into costs, the operator may easily predict the necessary costs of changing the SLA value of the network slice, thereby performing efficient network operation according to the network slice.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a network slice management function (NSMF) configured to deploy a network slice of a communication system, comprising:
   transmitting, based on a network slice requirement, a message requesting a service level agreement (SLA) range for a network slice subnet and a resource according to the SLA range, to a network slice subnet management function (NSSMF) configured to manage the network slice subnet included in network slice subnets associated with the network slice;
   receiving mapping information between SLA and deployment flavors of the network slice subnet unit from the NSSMF, the mapping information of the network slice subnet including an SLA value of the SLA range and a resource required according to the SLA value;
   generating the network slice based on mapping information of the network slice subnets; and
   deploying the generated network slice.

2. The method of claim 1, further comprising receiving the network slice requirement from a communication service management function (CSMF) generating the network slice requirement based on a requirement associated with a communication service.

3. The method of claim 1, further comprising:
   obtaining the resource according to the SLA range allocated to the network slice based on mapping relationship between the SLA and the deployment flavors of the network slice determined by using the mapping information of the network slice subnets before deployment of the network slice.

4. The method of claim 1, wherein
   the NSMF is included in an end-to-end orchestrator (E2E-O),
   wherein the NSMF connects to a plurality of NSSMFs including the NSSMF,
   wherein the plurality of NSSMFs comprise at least one of a random access network (RAN) NSSMF, a transport NSSMF, or a core network (CN) NSSMF, and
   wherein the mapping information of the network slice subnets are obtained from the plurality of NSSMFs.

5. The method of claim 3, wherein the mapping information of the network slice subnet includes information on the resource required according to the SLA value in case that the SLA value has a range between a first value and a second value,
   wherein the information on the resource includes a random access memory (RAM) and a central processing unit (CPU), and
   wherein each of a value of the RAM and a value of the CPU is a function using the range between the first value and the second value.

6. A method performed by a network slice subnet management function (NSSMF) configured to deploy a network slice subnet included in network slice subnets associated with a network slice of a communication system, comprising:
   receiving, based on a network slice requirement, a message requesting a service level agreement (SLA) range for the network slice subnet and a resource according to the SLA range from a network slice management function (NSMF) configured to manage the network slice; and
   transmitting mapping information between SLA and deployment flavors of the network slice subnet to the NSMF, the mapping information of the network slice subnet including an SLA value of the SLA range and a resource required according to the SLA value,
   wherein the network slice is generated and deployed based on mapping information of the network slice subnets.

7. The method of claim 6, wherein the network slice requirement is transmitted from a communication service management function (CSMF) generating the network slice requirement based on a requirement associated with a communication service.

8. The method of claim 6, wherein the resource according to the SLA range allocated to the network slice is identified based on mapping relationship between the SLA and the deployment flavors of the network slice determined by using the mapping information of the network slice subnets before deployment of the network slice.

9. The method of claim 6, wherein the NSMF is included in an end-to-end orchestrator (E2E-O),
   wherein the NSMF connects to a plurality of NSSMFs including the NSSMF,
   wherein the plurality of NSSMFs comprise at least one of a random access network (RAN) NSSMF, a transport NSSMF, or a core network (CN) NSSMF, and
   wherein the mapping information of the network slice subnets are obtained from the plurality of NSSMFs.

10. The method of claim 8, wherein the mapping information of the network slice subnet includes information on the resource required according to the SLA value in case that the SLA value has a range between a first value and a second value,
    wherein the information on the resource includes a random access memory (RAM) and a central processing unit (CPU), and
    wherein each of a value of the RAM and a value of the CPU is a function using the range between the first value and the second value.

11. A device of a network slice management function (NSMF) configured to deploy a network slice of a communication system, comprising:
    at least one control unit comprising circuitry configured to:
    transmit, based on a network slice requirement, a message requesting a service level agreement (SLA) range for a network slice subnet and a resource according to the SLA range to a network slice subnet management function (NSSMF) configured to manage the network slice subnet included in network slice subnets associated with the network slice;
    receive mapping information between SLA and deployment flavors of the network slice subnet from the NSSMF, the mapping information of the network slice subnet including an SLA value of the SLA range and a resource required according to the SLA value;
    generate the network slice based on mapping information of the network slice subnets; and
    deploy the generated network slice.

12. The device of claim 11, wherein the at least one control unit is further configured to receive the network slice requirement from a communication service management function (CSMF) generating the network slice requirement based on a requirement associated with a communication service.

13. The device of claim 11, wherein the at least one control unit is further configured to obtain the resource according to the SLA range allocated to the network slice based on mapping relationship between the SLA and the deployment flavors of the network slice determined by using the mapping information of the network slice subnets before deployment of the network slice.

14. The device of claim 11, wherein the NSMF is included in an end-to-end orchestrator (E2E-O),
    wherein the NSMF connects to a plurality of NSSMFs including the NSSMF,
    wherein the plurality of NSSMFs comprise at least one of a random access network (RAN) NSSMF, a transport NSSMF, or a core network (CN) NSSMF, and
    wherein the mapping information of the network slice subnets are obtained from the plurality of NSSMFs.

15. The device of claim 13, wherein the mapping information of the network slice subnet includes information on the resource required according to the SLA value in case that the SLA value has a range between a first value and a second value, and
    wherein the information on the resource includes a random access memory (RAM) and a central processing unit (CPU), and
    wherein each of a value of the RAM and a value of the CPU is a function using the range between the first value and the second.

16. A device of a network slice subnet management function (NSSMF) configured to deploy a network slice subnet included in network slice subnets associated with a network slice of a communication system, comprising:
    at least one control unit comprising circuitry configured to:
    receive, based on a network slice requirement, a message requesting a service level agreement (SLA) range for the network slice subnet and a resource according to the SLA range from a network slice management function (NSMF) configured to manage the network slice; and
    transmit mapping information between SLA and deployment flavors of the network slice subnet to the NSMF, the mapping information of the network slice subnet including an SLA value of the SLA range and a resource required according to the SLA value,
    wherein the network slice is generated and deployed based on mapping information of the network slice subnets.

17. The device of claim 16, wherein the control unit is further configured to receive the network slice requirement from a communication service management function (CSMF) generating the network slice requirement based on a requirement associated with a communication service.

18. The device of claim 16, wherein the resource according to the SLA range allocated to the network slice is identified based on mapping relationship between the SLA and the deployment flavors of the network slice determined by using the mapping information of the network slice subnets before deployment of the network slice.

19. The device of claim 16, wherein the NSMF is included in an end-to-end orchestrator (E2E-O),
    wherein the NSMF connects to a plurality of NSSMFs including the NSSMF,
    wherein the plurality of NSSMFs comprise at least one of a random access network (RAN) NSSMF, a transport NSSMF, or a core network (CN) NSSMF, and
    wherein the mapping information of the network slice subnets are obtained from the plurality of NSSMFs.

20. The device of claim 8, wherein the mapping information of the network slice subnet includes information on the resource required according to the SLA value in case that the SLA value has a range between a first value and a second value,
    wherein the information on the resource includes a random access memory (RAM) and a central processing unit (CPU), and
    wherein each of a value of the RAM and a value of the CPU is a function using the range between the first value and the second value.

* * * * *